United States Patent Office 3,535,337
Patented Oct. 20, 1970

3,535,337
1-p-CHLOROBENZOYL-2-METHYL-3-METALLO-
METHYL INDOLES
John Martin Chemerda, Watchung, and Meyer Sletzinger,
North Plainfield, N.J., assignors to Merck & Co., Inc.,
Rahway, N.J., a corporation of New Jersey
No Drawing. Filed July 26, 1967, Ser. No. 656,005
Int. Cl. C07d 27/56
U.S. Cl. 260—326.16          2 Claims

ABSTRACT OF THE DISCLOSURE

This case relates to novel 1-p-chlorobenzoyl-2-methyl-3-indolylacetic acid derivatives, particularly where the 3-position of the indocin molecule has a methyl halo, a methyl alkali metal, a methyl halo magnesium or a methyl group.

This invention relates to a new method for preparing certain 1 - benzoyl - 2 - methyl - 3 - indolylacetic acid derivatives. More particularly, it relates to a new method and intermediates for preparing 1 - p - chlorobenzoyl - 2-methyl - 3 - indolylacetic acids of the Formula I:

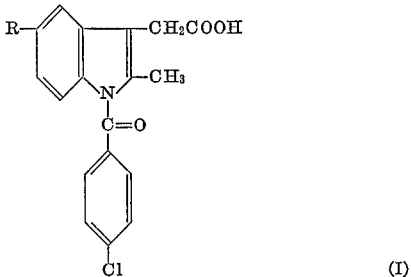

(I)

wherein R is methoxy or dimethylamino. These compounds are disclosed and claimed in U.S. Pat. No. 3,161,654, issued Dec. 15, 1964, to Shen.

In the Shen patent, 1 - p - chlorobenzoyl - 2 - methyl-3-indolylacetic acids are prepared by a series of reactions in which a 2 - methyl - 3 - indolylacetic acid is dehydrated to the corresponding anhydride; the anhydride is treated with t-butyl alcohol to give the corresponding ester; the t-butyl ester is then acylated at the 1-position with p-chlorobenzoyl chloride; and the resulting 1-acylate is converted to the free acetic acid derivative by pyrolysis process. It is an object of this invention to provide a new method of obtaining these compounds. It is a further object to provide new compounds which are useful in the practice of the foregoing method.

It has now been discovered in accordance with the present invention that 1 - p - chlorobenzoyl - 2 - methyl - 3-indolylacetic acids of Formula I can be prepared by a process which comprises treating an organometallic compound of the Formula II:

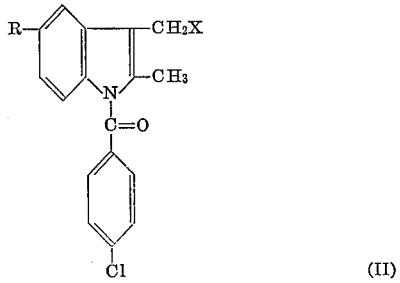

(II)

with carbon dioxide. In Formula II, R is methoxy or dimethylamino and X stands for an alkali metal or a halomagnesio radical. In particular, X stands for a lithio, sodio, potassio, bromomagnesio, iodomagnesio or a chloromagnesio radical.

Advantageously, the present invention can be practiced by adding carbon dioxide in the form of Dry Ice to the starting material of Formula II. For convenience, it is desirable to cool the starting material to be treated with carbon dioxide to below 0° C., preferably to a temperature of −50° to −90° C., and, ideally, to a temperature in the range of −60° to −75° C. After reaction with carbon dioxide has proceeded to the desired point, the reaction mixture can then be treated with an aqueous acid to form the free acid from the salt which may have formed due to the presence of metal ions in the reaction mixture. Suitable acids for this purpose are aqueous acids such as acetic acid, hydrochloric acid, sulfuric acid and the like. The amount of carbon dioxide which is added to the starting material of Formula I is not critical. Best yields are obtained when an excess of carbon dioxide is used.

The treatment with carbon dioxide is best conducted in an inert solvent such as acetone, benzene, diethyleneglycol dimethyl ether, diethyleneglycol diethyl ether, diethyleneglycol dibutyl ether, dioxane, ethyl ether and tetrahydrofuran and the like. The preferred solvent is diethyleneglycol dimethyl ether.

The product of the reaction with carbon dioxide is normally obtained as a precipitate in the reaction mixture. It can be isolated therefrom by filtration and then purified by recrystallization in a solvent such as t-butanol.

The organometallic starting materials for the reaction with carbon dioxide can be obtained in several different ways. For example, the compounds of Formula II wherein X is halomagnesio can be obtained in either of two ways. A compound, 1 - p - chlorobenzoyl - 2 - methyl - 5 - R - 3-indolylmethanol can be treated with a mixture of titanium tetrachloride and an alkyl-magnesium halide such as propylmagnesium bromide. This reaction is conducted in ether at reflux temperature for a few hours and leads to the formation of a Grignard reagent by replacement of the hydroxy group on the 3-position of the indole nucleus with a halomagnesio radical. Alternatively, the same Grignard reagent can be prepared by treating 1-p-chlorobenzoyl - 2 - methyl - 5 - R - 3 - halomethylindole with magnesium in a solvent such as ether or tetrahydrofuran. By whatever means obtained, the Grignard reagent can then reacted with carbon dioxide as described above.

The compounds of Formula II wherein X is an alkali metal can be obtained by reaction of 1-p-chlorobenzoyl-5-R - 2,3 - dimethylindole with both an alkali metal such as sodium, potassium or lithium and thioanisole, the reaction being conducted in a solvent such as dimethoxyethane. Two moles of the alkali metal and one mole of thioanisole are used for each mole of the indole. The reaction is conveniently conducted at temperatures of −10° to 10° C., preferably around 0° C., and, after a short time, the desired alkali metal derivative (the compound of Formula II wherein X is sodio, potassio or lithio), can be recovered in the filtrate of the reaction product. Alternatively, alkali metal derivatives of Formula II can be prepared by the reaction of an alkali metal aryl compound such as lithium phenyl with a 1 - p - chlorobenzoyl - 5 - R - 2,3 - dimethylindole. This reaction is conducted in the same manner as a conventional Grignard reaction. Still another way to obtain the desired organometallic compounds of Formula II is by the reaction of an alkali metal alkane such as n-butyl lithium with a 1 - p - chlorobenzoyl - 2 - methyl - 5 - R - 3 -bromomethylindole. This reaction is also conducted in the same manner as a Grignard reaction except that the reaction temperature should be maintained at a point well below 0° C.

The compound, 1-p-chlorobenzoyl-5-R-2,3-dimethylindole, which is used for the reaction with an alkali metal to yield a starting material of Formula II is readily obtainable by the reaction of 2,3-dimethyl-5-methoxyindole and 1-p-chlorobenzoyl chloride in the presence of sodium hydride using dimethylformamide as a reaction medium.

The compound, 1-p-chlorobenzoyl-2-methyl-5-R-3-halomethylindole, which is used for the reaction with n-butyl lithium to produce a starting material of Formula II, can be obtained by the reaction of one mole of thionylbromide with 1-p-chlorobenzoyl-2-methyl-5-R-3-indolymethanol. The latter compound is in turn preparable by reaction of 1-p-chlorobenzoyl-2-methyl-5-R-indole-3-carboxaldehyde with dimethyl borane.

The following examples are presented to further illustrate the present invention.

EXAMPLE 1

Preparation of 1-p-chlorobenzoyl-2-methyl-5-methoxy-3-indolyl-methanol (A) 2-methyl-5-methoxyindole-3-carboxaldehyde.—Into a 100 ml. flask, 36.5 g. of anhydrous dimethylformamide is charged and cooled to −5° C. Phosphorus oxychloride (15.34 g.) is added dropwise at −5° to 0° C. After completion of addition, 8.05 g. of 2-methyl-5-methoxyindole is added portionwise at 20° to 25° C. After aging for one hour at room temperature, 20 g. of dry calcium carbonate is added and the reaction mixture is heated to 60° C. over a one hour period. The mixture is then cooled to 10° C. and quenched into 100 ml. of 30% sodium acetate solution followed by dilution with water to 500 ml. After addition of 20 g. of sodium hydroxide, the mixture is refluxed for two hours and cooled to 10° C. The solid is filtered, washed with water and dried in vacuo.

(B) 1-p-chlorobenzoyl-2-methyl-5-methoxyindole-3-carboxaldehyde.—To a slurry of 4.8 g. sodium hydride (50% oil emulsion) in 25 ml. of anhydrous dimethylformamide is added 18.92 g. of 2-methyl-5-methoxyindole-3-carboxaldehyde in 50 ml. of anhydrous dimethylformamide at 10° C. with good stirring. The reaction mixture is aged for one hour to complete the N-sodium salt formation. 18.0 g. of-p-chlorobenzoyl chloride is added dropwise maintaining the temperature between 0° and 10° C. After the addition is completed, the mixture is aged at 20–25° C. for 4 hours, then quenched in 300 ml. of ice-cold water containing 10 ml. of acetic acid. The precipitated solid is filtered, washed with water and dried in vacuo.

(C) 1 - p-chlorobenzoyl-2-methyl-5-methoxyindole-3-methanol.—Ten grams of 1-p-chlorobenzyl-2-methyl-5-methoxyindole-3-carboxaldehyde is suspended in 25 ml. of glacial acetic acid. A solution of 2.5 g. of dimethyl borane in 20 ml. of glacial acetic acid is added dropwise to the aldehyde suspension. After the addition is complete, the reaction mixture is heated under reflux for 10 minutes and allowed to cool. 6.0 ml. of cold water is added and the precipitated 1-p-chlorobenzoyl-2-methyl-5-methoxyindole-3-methanol is filtered, washed with cold water and dried in vacuo.

The corresponding 5-dimethylamino analog is prepared by the procedure of Example 1 substituting 2-methyl-5-dimethylaminoindole in Part A to obtain 2-methyl-5-dimethylaminoindole-3-carboxaldehyde; using the latter as a starting material in Part B of Example 1 to obtain 1-p-chlorobenzoyl - 2 - methyl-5-dimethylaminoindole-3-carboxaldehyde; and reducing the latter by the procedure of Part C to give the desired 1-p-chlorobenzoyl-2-methyl-5-dimethylaminoindole-3-methanol.

EXAMPLE 2

To a solution of 3.3 g. of 1-p-chlorobenzoyl-2-methyl-5-methoxy-3-indolymethanol in 50 ml. of ether, 0.3 g. of titanium tetrachloride and 20 ml. of one molar propylmagnesium bromide in ether are added. The reaction mixture is refluxed for 5 hours to give the product 1-p-chlorobenzoyl - 2-methyl-5-methoxy-3-indolymethylmagnesium bromide in solution. The solution is cooled to −10° C. and finely powdered Dry Ice (about 10 g.) is added. The reaction mixture is allowed to warm up to room temperature, then poured into 100 ml. of ice-cold water containing 10 ml. of acetic acid. The organic phase is separated; the aqueous layer is extracted with methylene chloride; and the combined organic phases are washed with water, dried over MgSO$_4$ and concentrated to dryness. The crude 1-p-chlorobenzoyl-2-methyl-5-methoxy-3-indolyacetic acid is recrystallized from t-butanol to afford pure material.

Following the procedure of Example 2 except for the substitution of 1-p-chlorobenzoyl-2-methyl-5-dimethylaminoindole-3-methanol for the indole used therein, there is obtained 1-p-chlorobenzoyl-2-methyl-5-dimethylamino-3-indolylmethylmagnesium bromide, which is treated with CO$_2$ to give 1-p-chlorobenzoyl-2-methyl-5-dimethylamino-3-indolyacetic acid.

EXAMPLE 3

(A) To a slurry of 2.6 g. of sodium hydride in 15 ml. of anhydrous dimethylformamide is added 17.5 g. of 2,3-dimethyl-5-methoxyindole (D. W. Ockenden, K. Schofield: J. Chem. Soc. 1957, 3175–80) in 75 ml. of dry dimethylformamide under nitrogen at 10° C. After the theoretical amount of hydrogen (2,200 ml.) has evolved, the reaction mixture is cooled to 0° C. and 15.5 g. of p-chlorobenzoyl chloride is added dropwise with stirring, maintaining the temperature between 0° C. and +10° C. by external cooling. The reaction mixture is aged for 2 hours at the same temperature, then poured into 250 ml. of ice-cold water. The precipitated solid is filtered, washed with water, dried in vacuo and recrystallized from benzene to give 1-p-chlorobenzoyl-2,3-dimethyl-5-methoxyindole.

(B) 1 - p-chlorobenzoyl-2,3-dimethyl-5-methoxyindole (3.14 g.) is dissolved in 30 ml. of dimethoxyethane containing 2.0 g. of thioanisole. The solution is cooled to 0° C. and 1.2 g. of potassium is added in small portions under nitrogen, and aged for 30 minutes. The precipitated potassium thiophenolate is filtered off, leaving the filtrate containing 1 - p-chlorobenzoyl-2-methyl-5-methoxy-3-potassiomethylindole.

(C) The filtrate from Part B is cooled to −70° C. in Dry Ice and acetone, and finely powdered Dry Ice is added (approximately 5 g.). The reaction mixture is quenched in 50 ml. of water containing 5 ml. of acetic acid, the solid is filtered, washed with water and recrystallized from t-butanol, yielding 1-p-chlorobenzoyl-2-methyl-5-methoxy-3-indolyacetic acid.

The reaction of Example 3, Part C, can be conducted with other solvents such as benzene, diethyleneglycol dimethyl ether, diethyleneglycol diethyl ether, diethyleneglycol dibutyl ether, dioxane, ethylether and tetrahydrofuran.

Similarly, for the carbonation of Part C, temperatures of −50° C. to −90° C. can be used, but it is preferable to conduct the reaction in the range of −60° to −75° C.

EXAMPLE 4

(A) To a slurry of 2.6 g. of sodium hydride in 15 ml. of anhydrous dimethylformamide is added 18 g. of 2,3-dimethyl-5-dimethylaminoindole in 75 ml. of dry dimethylformamide under nitrogen at 10° C. After the theoretical amount of hydrogen (2,200 ml.) has evolved, the reaction mixture is cooled to 0° C. and 15.5 g. of p-chlorobenzoyl chloride is added dropwise with stirring, maintaining the temperature between 0° and +10° C. by external cooling. The reaction mixture is aged for 2 hours at the same temperature, then poured into 250 ml. of ice-cold water, dried in vacuo and recrystallized from benzene to give 1-p-chlorobenzoyl - 2,3 - dimethyl-5-dimethylaminoindole.

(B) 1-p-chlorobenzoyl - 2,3-dimethyl-5-dimethylaminoindole (3.3 g.) is dissolvd in 30 ml. of dimethoxyethane containing 2.0 g. of thioanisole. The solution is cooled to 0° C. and 1.2 g. of potassium is added in small portions under nitrogen and aged for 30 minutes. The precipitated potassium thiophenolate is filtered off, leaving the filtrate containing 1-p-chlorobenzoyl-2-methyl-5-dimethylamino-3-potassiomethylindole.

(C) The filtrate from Part B is cooled to −70° C. in Dry Ice and acetone and finely powdered Dry Ice is added (approximately 5 g.). The reaction mixture is quenched in 50 ml. of water and the pH of the mixture is adjusted to 5.5–6.0 by addition of acetic acid, the solid is filtered, washed with water and recrystallized from aqueous ethanol, yielding 1-p-chlorobenzoyl-2-methyl-5-dimethylamino-3-indolylacetic acid.

EXAMPLE 5

(A) 1-p-chlorobenzoyl - 2,3-dimethyl-5-methoxyindole (6.3 g.) is dissolved under argon in 50 ml. of anhydrous ether. The solution is cooled to 0° C. and 30 ml. of a one molar phenyl lithium solution in ether is added dropwise over 20 minutes, giving a solution of 1-p-chlorobenzoyl-2-methyl-5-methoxy-3-lithiomethylindole.

(B) The solution from Part A is cooled to −75° C. and finely powdered Dry Ice is added (about 10 g.). The reaction mixture is allowed to warm up to room temperature, then poured into 100 ml. of ice-cold water containing 10 ml. of acetic acid. The organic phase is separated. The aqueous layer is extracted with methylenechloride and the combined organic phases are washed with water, dried over MgSO₄ and concentrated to dryness. The crude 1-p-chlorobenzoyl-2-methyl-5-methoxyindole-3-acetic acid is purified by recrystallization from t-butanol.

Phenylsodium or n-butyllithium can be used as the metallizing agent in the procedure of Example 5, Part A.

EXAMPLE 6

(A) 1-p-chlorobenzoyl - 2,3-dimethyl-5-dimethylamino-indole (7 g.) is dissolved under argon in 50 ml. of anhydrous ether. The solution is cooled to 0° C. and 30 ml. of a one molar phenyl lithium solution in ether is added dropwise over 20 minutes, giving a solution of 1-p-chlorobenzoyl-2-methyl-5 - dimethylamino - 3 - lithiomethylindole.

(B) The solution from Part A is cooled to −75° C. and finely powdered Dry Ice is added (about 10 g.). The reaction mixture is allowed to warm up to room temperature, then poured into 100 ml. of ice-cold water. Acetic acid is added with stirring to adjust the pH to 5.5–6.0. The organic phase is separated. The aqueous layer is extracted with methylenechloride and the combined organic phases are washed with water, dried over MgSO₄ and concentrated to dryness. The crude 1-p-chlorobenzoyl-2-methyl-5-dimethylaminoindole-3-acetic acid is purified by recrystallization from aqueous ethanol.

Phenylsodium or n-butyllithium can be used as the metallizing agent in the procedure of Example 6, Part A.

EXAMPLE 7

(A) Into a 50 ml. three-necked flask, 3.17 g. of 1-p-chlorobenzoyl-2-methyl-5-methoxy-3-indolylmethanol, 3 g. of dry calcium carbonate and 30 ml. of anhydrous benzene are charged. Thionylbromide (12.8 g.) is added with stirring over 20 minutes; then the reaction mixture is heated to 40° C. for 30 minutes. The inorganic salts are filtered; the cake is washed with benzene; and the combined extracts and washes are washed with water, dried over MgSO₄. After removal of the solvent, 1-p-chlorobenzoyl-2-methyl-5-methoxy - 3 - bromomethylindole is obtained.

(B) An ethereal solution (15 ml.) of one mole of n-butyl lithium is added dropwise at −80° C. to a stirred solution of 3.2 g. of 1 - p - chlorobenzoyl - 2 - methyl-5-methoxy-3-bromomethylindole in 25 ml. of tetrahydrofuran over 5 minutes. The resulting solution contains 1-p-chlorobenzoyl-2-methyl-5-methoxy - 3-lithiomethylindole and is used immediately in Part C.

(C) Finely powdered Dry Ice (5 g.) is added to the solution prepared in Part B. The reaction mixture is poured into 50 ml. of 10% acetic acid. Extraction with methylenechloride and recrystallization from t-butanol gives the product, 1-p-chlorobenzoyl-2-methyl-5-methoxy-3-indolylacetic acid.

The reaction described in Part C is conducted at temperatures between −50° C. and −90° C., preferably between −60° and −70° C. Extremely low temperatures and short reaction times are essential in order to minimize the self-condensation of the 1-p-chlorobenzoyl-2-methyl-5-methoxy-3-lithiomethylindole. Other solvents for the reaction are: benzene, hexane, diethyleneglycol dimethyl ethers, dioxane, ether and tetrahydrofuran. Ether or tetrahydrofuran are preferred.

EXAMPLE 8

(A) Into a 50 ml. three-necked flask, 4 g. of 1-p-chlorobenzoyl - 2 - methyl - 5 - dimethylamino-3-indolylmethanol, 3 g. of dry calcium carbonate and 30 ml. of anhydrous benzene are charged. Thionylbromide (12.8 g.) is added with stirring over 20 minutes; then the reaction mixture is heated to 40° C. for 30 minutes. The inorganic salts are filtered; the cake is washed with benzene; and the combined extracts and washes are washed with water and dried over MgSO₄. After removal of the solvent, 1-p-chlorobenzoyl-2-methyl-5-dimethylamino-3-bromomethylindole is obtained.

(B) An ethereal solution (15 ml.) of one mole of n-butyl lithium is added dropwise at −80° C. to a stirred solution of 4 g. of 1-p-chlorobenzoyl-2-methyl-5-dimethylamino-3-bromomethylindole in 25 ml. of tetrahydrofuran over 5 minutes. The resulting solution contains 1 - p - chlorobenzoyl-2-methyl-5-dimethylamino-3-lithiomethylindole and is used immediately in Part C.

(C) Finely powdered Dry Ice (5 g.) is added to the solution prepared in Part B. The reaction mixture is poured into 50 ml. of 10% acetic acid. Extraction with methylenechloride and recrystallization from aqueous ethanol gives the product 1-p-chlorobenzoyl-2-methyl-5-dimethylamino-3-indolylacetic acid.

EXAMPLE 9

(A) To 0.5 g. of magnesium in 50 ml. of anhydrous ether is added 3.92 g. of 1-p-chlorobenzoyl-2-methyl-5-methoxy-3-bromomethylindole in 30 ml. of anhydrous tetrahydrofuran under nitrogen over 15 minutes, yielding a solution of 1-p-chlorobenzoyl-2-methyl-5-methoxy-3-indolylmethyl magnesium bromide.

(B) The reaction mixture from Part A is poured into a well-stirred slurry of Dry Ice in anhydrous ether protected from moisture. The mixture is allowed to warm up to room temperature, then quenched in 100 ml. of 10% acetic acid solution. The organic phase is separated and washed with dilute acetic acid and then water. After removal of the solvent, the residue is recrystallized from t-butanol to give 1-p-chlorobenzoyl-2-methyl-5-methoxy-3-indolylacetic acid.

EXAMPLE 10

(A) To 0.5 g. of magnesium in 50 ml. of anhydrous ether is added 4.5 g. of 1-p-chlorobenzoyl-2-methyl-5-dimethylamino-3-bromomethylindole in 30 ml. of anhydrous tetrahydrofuran under nitrogen over 15 minutes, yielding a solution of 1-p-chlorobenzoyl-2-methyl-5-dimethylamino-3-indolylmethyl magnesium bromide.

(B) The reaction mixture from Part A is poured into a well-stirred slurry of Dry Ice in anhydrous ether protected from moisture. The mixture is allowed to warm up to room temperature, then quenched in 100 ml of water. The pH of the mixture is adjusted to 5.5–6.0 by addition of acetic acid. The organic phase is separated and washed with water. After removal of the solvent, the residue is recrystallized from aqueous ethanol to give 1 - p - chlorobenzoyl-2-methyl-5-dimethylamino-3-indolylacetic acid.

We claim:
1. A compound of the formula:
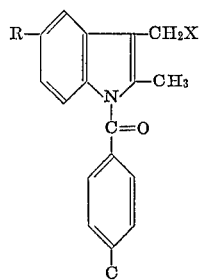
wherein R is methoxy or dimethylamino and X is either sodio, potassio, lithio or halomagnesio.
2. The compound of claim 1 wherein R is methoxy.
References Cited
FOREIGN PATENTS
6,508,553    1/1966    Netherlands.
ALEX MAZEL, Primary Examiner
J. A. NARCAVAGE, Assistant Examiner
U.S. Cl. X.R.
260—326.13, 326.14, 326.15